Patented Feb. 9, 1943

2,310,809

UNITED STATES PATENT OFFICE 2,310,809

METHOD OF PREPARING DIOLEFINS

Walter Reppe, Adolf Steinhofer, and Guenther Daumiller, Ludwigshafen-on-the-Rhine, Germany; vested in the Alien Property Custodian No Drawing. Application April 6, 1940, Serial No. 328,382. In Germany April 6, 1939

8 Claims. (Cl. 260—682)

The present invention concerns an improved method of preparing diolefins by splitting off water from aliphatic glycols having at least four carbon atoms. It is an object of our invention to provide a method whereby diolefins, in particular butadiene-1.3, can be produced in a particularly efficient manner in a continuous process.

It is known that diolefins can be prepared by passing vaporized glycols, for example, butylene glycols, preferably under the addition of steam or other diluent gases, over catalysts having a dehydrating action at elevated temperatures. The use of acid phosphate catalysts, as disclosed in United States Patent No. 1,841,055, has proved particularly efficient. This method, although yielding a far-reaching conversion of glycols into diolefins, is accompanied by the formation of certain by-products, such as aldehydes, high-boiling oily products and hydrocarbons having a smaller number of carbon atoms than the starting material and the desired diolefin. The amount of these by-products steadily increases when carrying out the dehydration for a longer period of time with the same catalyst.

We have now found that by carrying out the dehydration of aliphatic glycols having at least four carbon atoms, in particular of 1.3- or 1.4-butylene glycol in the presence of vaporized organic compounds which are liquid under ordinary conditions and which, if changed at all, are not decomposed under the reaction conditions with the formation of products different from diolefins, the yield of diolefins is considerably increased, by-product formation is reduced, and the activity of the catalysts is kept at a high level for a long time.

We prefer to lead the vaporized organic compounds in a cycle, by separating them from the reaction product after the reaction gases have emerged from the reaction vessel, and adding them to the fresh starting material which is to be passed through the reaction vessel. Generally speaking, the vapors emerging from the reaction vessel may be easily separated into the constituents, e. g. into butadiene, water and organic diluent, by fractional distillation in two columns connected with each other. High boiling diolefins may be separated from water together with the liquefied diluent, and then separated by fractional distillation from the diluent which is to be recycled. The organic diluent may be returned directly into the vessel in the liquid form or it may first be passed, if desired together with the glycol, through a vaporizer and passed into the reaction vessel in the vaporous state.

Suitable organic liquids are for example such compounds which do not undergo any reaction when passed over dehydration catalysts and which may be easily separated from water and diolefins. Such liquids are in particular aliphatic or cycloaliphatic or aromatic hydrocarbons and chlorinated hydrocarbons, e. g. hexane, cyclohexane or liquid mixtures of various aliphatic hydrocarbons, tetrachlormethane, benzene or toluene. There may also be used liquids which are partly decomposed under the reaction conditions to form the diolefin to be prepared. For example, when preparing butadiene-1.3 according to our invention by dehydrating 1.3- or 1.4-butylene glycol, there may be used as a diluent vaporous tetrahydrofurane. Since tetrahydrofurane may be formed when leading 1.4-butylene glycol over dehydration catalysts, our invention may also be carried out in the case of producing butadiene from 1.3-butylene glycol by adding to this starting material a certain amount of 1.4-butylene glycol from which tetrahydrofurane is formed within the reaction vessel.

When preparing butadiene from 1.4-butylene glycol, the reaction conditions may be so chosen that only part of the glycol is completely dehydrated, the balance being converted into tetrahydrofurane which is then utilized as the organic diluent.

While our invention is not restricted to the use of specific dehydration catalysts, it is preferable to employ catalysts consisting of or containing such salts of the oxygen acids of phosphorus as have an acid reaction under the conditions of working as, for example, by hydrolysis or dissociation. These substances include not only the so-called acid salts of various phosphorus acids but also such neutral salts as have an acid reaction under the reaction conditions. The catalysts may be prepared in any known and suitable manner as, for example, from the acids of phosphorus and the oxides, hydroxides, carbonates and the like, of light or heavy metals, or by the precipitation of soluble salts of these acids by means of metallic salts, well-defined hydrogen-ion concentrations being preferably maintained. In many instances it is advantageous to employ mixtures of different salts, such as primary initial material and on the phosphatic salts and the like, the relative proportions of the mixtures being variable within wide limits. The catalysts may be used, as such, after a preliminary pressing and moulding, or deposited on carriers or mixed with carrier substances such as pumice, graphite, bleaching earths such as fuller's earth and the like.

Suitable catalysts are also phosphoric acid salts in admixture with a free acid of phosphorus. In place of the said free acids such substances as supply free acids under the conditions of working, as, for example, ammonium phosphates, the phosphates of organic amines, acid esters and the like may also be employed. The preparation of the catalysts may be conducted, for example, by effecting the precipitation or crystallization of the salts in an acid solution, such as a solution in phosphoric acid, in which case, given a suitable concentration of the acid during the precipitation or crystallization, salts with a definite small content of free acid can be obtained.

The process may be carried out under ordinary, reduced or elevated pressure. Besides the vaporized organic liquids other inert diluents, in particular steam, may be used. The amount of the vaporized organic liquid may vary to a considerable extent. There may be used one, two, five or six molecular proportions or more thereof for each molecular proportion of the starting glycol. The choice of the reaction temperature depends on the nature of the initial material and the catalyst employed, and generally speaking is between 150° and 500° C., more particularly between about 200° and 400° C.

As mentioned above, our process offers great advantage in the technical production of diolefins from aliphatic glycols by increasing the yield of diolefins, reducing the amount of by-products and increasing the length of service of the catalyst. The presence of organic vapors which are not or only partly (in the case of tetrahydrofurane) subject to conversions has also a favorable influence on the maintenance of the temperature within the catalyst zone. Extensive temperature fluctuations which may cause side-reactions are thus prevented. Since the specific heat of the organic vapors is given to the catalyst which would otherwise be cooled off by the endothermic reaction, catalyst zones of lower temperatures are not formed, the yield and the life of the catalyst are not reduced, and its is possible to carry out the reaction for a long time without reducing the throughput per unit of time and reaction space. The reaction according to our invention may be carried out in very simply-constructed vessels, because the total or a substantial amount of the heat necessary for splitting off water from glycols may be furnished by the starting vapors. For example, the organic compound may be overheated, preferably before admixing it with the vaporized glycol.

Th following examples illustrate certain ways in which the principle of our invention may be applied, but are not to be construed as limiting the invention. The parts are by weight unless otherwise stated.

*Example 1*

An aqueous solution of primary sodium phosphate, or an aqueous solution of equimolecular quantities of phosphoric acid and caustic soda solution, just giving a yellow color reaction with methyl orange as indicated, is treated with an addition of such an amount of phosphoric acid that the solution contains 8 per cent of free phosphoric acid with reference to the anhydrous primary sodium phosphate. The solution is concentrated, on the water bath or in vacuo, until 1 cubic centimeter contains about 1.1 to 1.2 grams of primary anhydrous sodium phosphate. It is then cooled down to 70° C., allowed to crystallize at that temperature, and centrifuged or filtered by suction. The resulting primary sodium phosphate, which contains about 2 per cent of free phosphoric acid in addition to about 9 per cent of water of crystallization is ground along with 20 per cent of powdered graphite and pressed into moulds.

After being introduced into the contact chamber, this catalyst is dehydrated, in a current of inert gas, such as nitrogen, air or carbon dioxide, passed through at such a rate as to refill the contact chamber about 5 to 10 times per minute, the initial temperature being 60° to 80° C., slowly rising to 150° C., and finishing off at 220° C.

Over this catalyst there are led at 250° C. the vapors of a mixture of 60 parts of 1.3-butylene glycol and 40 parts of water at a rate of 60 grams per hour for each liter of the catalyst. Simultaneously, 180 grams per hour of vaporized n-hexane are led in a cycle over the catalyst. After four weeks, the yield of butadiene still amounts to 85 per cent, whereas under otherwise identical conditions but without the addition of hexane, the yield of butadiene has already been reduced after that time.

*Example 2*

A vaporous mixture of 40 parts of 1.3-butylene glycol, 20 parts of 1.4-butylene glycol and 40 parts of water are led at 260° C. over a catalyst as described in Example 1 at a rate of 60 grams per hour for each liter of the catalyst. The reaction gases are condensed by cooling and then distilled. There is obtained in addition to butadiene and water tetrahydrofurane which is continuously admixed with the starting mixture. Butadiene-1.3 is thus obtained in a yield of 90 per cent. The process may thus be carried out for many weeks without a decrease in the yield of butadiene.

*Example 3*

Under the conditions described in Example 2, there is led over the catalyst at 280° C. a mixture of 60 parts of 1.4-butylene glycol with 40 parts of steam. The catalyst has been prepared by pulverizing crystallized primary sodium phosphate, pressing it into moulds and heating it slowly to 220° C.

The mixture emerging from the catalyst is separated into butadiene, aqueous tetrahydrofurane and water. The tetrahydrofurane is led in a cycle into a vaporizer where it is admixed with the starting mixture and heated to 380° C. and then back to the reaction vessel. The yield of butadiene is 95 per cent for a very long reaction period.

*Example 4*

100 parts of anhydrous primary sodium phosphate are dissolved in 40 parts of water and mixed with 8 parts of primary n-butylamine phosphate together with 20 parts of graphite. The product is then evaporated while stirring, and the solidified mass is finally heated to a temperature of 160° C. After cooling down the mass is broken up into pieces of the desired size and is screened. Over the granules thus obtained there is led a vaporous mixture of 60 parts of 1.3-butylene glycol and 40 parts of water at a rate of 60 grams per hour and per liter of the catalyst at 280° C. Simultaneously there are led in a cycle over the catalyst 150 grams of vaporous benzene per hour and liter of the catalyst. The yield of butadiene amounts to 90 per cent and remains unchanged for many weeks.

Instead of benzene there may also be used toluene, xylene or cyclohexane.

What we claim is:

1. In the production of diolefins by catalytic dehydration of aliphatic glycols having at least four carbon atoms the step of passing one molecular proportion of the said initial materials in the gaseous phase at elevated temperature over the catalyst in the presence of at least one molecular proportion of a vaporized organic compound which is liquid under ordinary conditions and which is not decomposed under the conditions of reaction.

2. In the production of butadiene by catalytic dehydration of butylene glycols the step of passing one molecular proportion of the butylene glycol in the gaseous phase at elevated temperature over the catalyst in the presence of at least one molecular proportion of a vaporized organic compound which is liquid under ordinary conditions and which is not decomposed under the conditions of the reaction.

3. In the production of butadiene by catalytic dehydration of butylene glycols the step of passing one molecular proportion of the butylene glycol in the gaseous phase at elevated temperature over the catalyst in the presence of steam and of at least one molecular proportion of a vaporized organic compound which is liquid under ordinary conditions and which is not decomposed under the conditions of the reaction.

4. In the production of diolefins by catalytic dehydration of aliphatic glycols having at least four carbon atoms the step of passing one molecular proportion of the said initial materials in the gaseous phase at elevated temperature over an acid phosphate catalyst in the presence of steam and of at least one molecular proportion of a vaporized organic compound which is liquid under ordinary conditions and which is not decomposed under the conditions of the reaction.

5. In the production of diolefins by catalytic dehydration of aliphatic glycols having at least four carbon atoms the step of passing one molecular proportion of the said initial materials in the gaseous phase at elevated temperature over an acid phosphate catalyst in the presence of steam and of at least one molecular proportion of a vaporized hydrocarbon which is liquid under ordinary conditions and which is not decomposed under the conditions of the reaction.

6. In the production of diolefins by catalytic dehydration of aliphatic glycols having at least four carbon atoms the step of passing one molecular proportion of said initial materials in the gaseous phase at elevated temperatures over the catalyst in the presence of at least one molecular proportion of vaporized hydrocarbons which are liquid under ordinary conditions and which are not decomposed under the conditions of the reaction.

7. In the production of butadiene by catalytic dehydration of butylene glycols the step of passing one molecular proportion of the butylene glycol in the gaseous phase at elevated temperature over the catalyst in the presence of at least one molecular proportion of vaporized hydrocarbons which are liquid under ordinary conditions and which are not decomposed under the conditions of the reaction.

8. In the production of butadiene by catalytic dehydration of butylene glycols the step of passing one molecular proportion of the butylene glycol in the gaseous phase at elevated temperature over the catalyst in the presence of steam and of at least one molecular proportion of vaporized hydrocarbons which are liquid under ordinary conditions and which are not decomposed under the conditions of the reaction.

WALTER REPPE.
ADOLF STEINHOFER.
GUENTHER DAUMILLER.